US008723919B2

(12) United States Patent
Seong

(10) Patent No.: US 8,723,919 B2
(45) Date of Patent: May 13, 2014

(54) THREE-DIMENSIONAL IMAGE PROCESSING APPARATUS AND THREE-DIMENSIONAL IMAGE PROCESSING METHOD

(75) Inventor: Hwa-seok Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 13/093,342

(22) Filed: Apr. 25, 2011

(65) Prior Publication Data

US 2012/0120055 A1 May 17, 2012

(30) Foreign Application Priority Data

Nov. 15, 2010 (KR) .......................... 10-2010-0113379

(51) Int. Cl.
*H04N 13/00* (2006.01)
(52) U.S. Cl.
USPC ............................................. 348/42; 348/43
(58) Field of Classification Search
None
See application file for complete search history.

(56) References Cited

U.S. PATENT DOCUMENTS

| | | | | |
|---|---|---|---|---|
| 6,163,337 | A  * | 12/2000 | Azuma et al. .................... | 348/43 |
| 2003/0085991 | A1* | 5/2003 | Toda ................................ | 348/42 |
| 2004/0239685 | A1* | 12/2004 | Kiyokawa et al. ............. | 345/619 |
| 2005/0105610 | A1* | 5/2005 | Sung ........................ | 375/240.01 |
| 2006/0290778 | A1* | 12/2006 | Kitaura et al. ................... | 348/51 |
| 2009/0142041 | A1* | 6/2009 | Nagasawa et al. ............. | 386/124 |
| 2011/0058019 | A1* | 3/2011 | Onozawa ......................... | 348/43 |

* cited by examiner

*Primary Examiner* — Joseph Ustaris
*Assistant Examiner* — Ellyar Y Barazesh
(74) *Attorney, Agent, or Firm* — Sughrue Mion, PLLC

(57) ABSTRACT

Provided are an image processing apparatus and an image processing method, the image processing apparatus including: a parallax estimation unit which estimates parallax with respect to a left eye image and a right eye image of a three-dimensional (3D) image; a horizontal movement value determination unit which determines a horizontal movement value using the estimated parallax; a horizontal movement unit which horizontally moves the left eye image and the right eye image based on the horizontal movement value; and a controller which calculates a chronological change rate of the estimated parallax for a predetermined time, determines whether the chronological change rate is greater than a predetermined threshold, and if the chronological change rate is greater, limits the horizontal movement value to a predetermined range and controls the horizontal movement unit to horizontally move the left eye image and the right eye image based on the limited horizontal movement value.

27 Claims, 7 Drawing Sheets

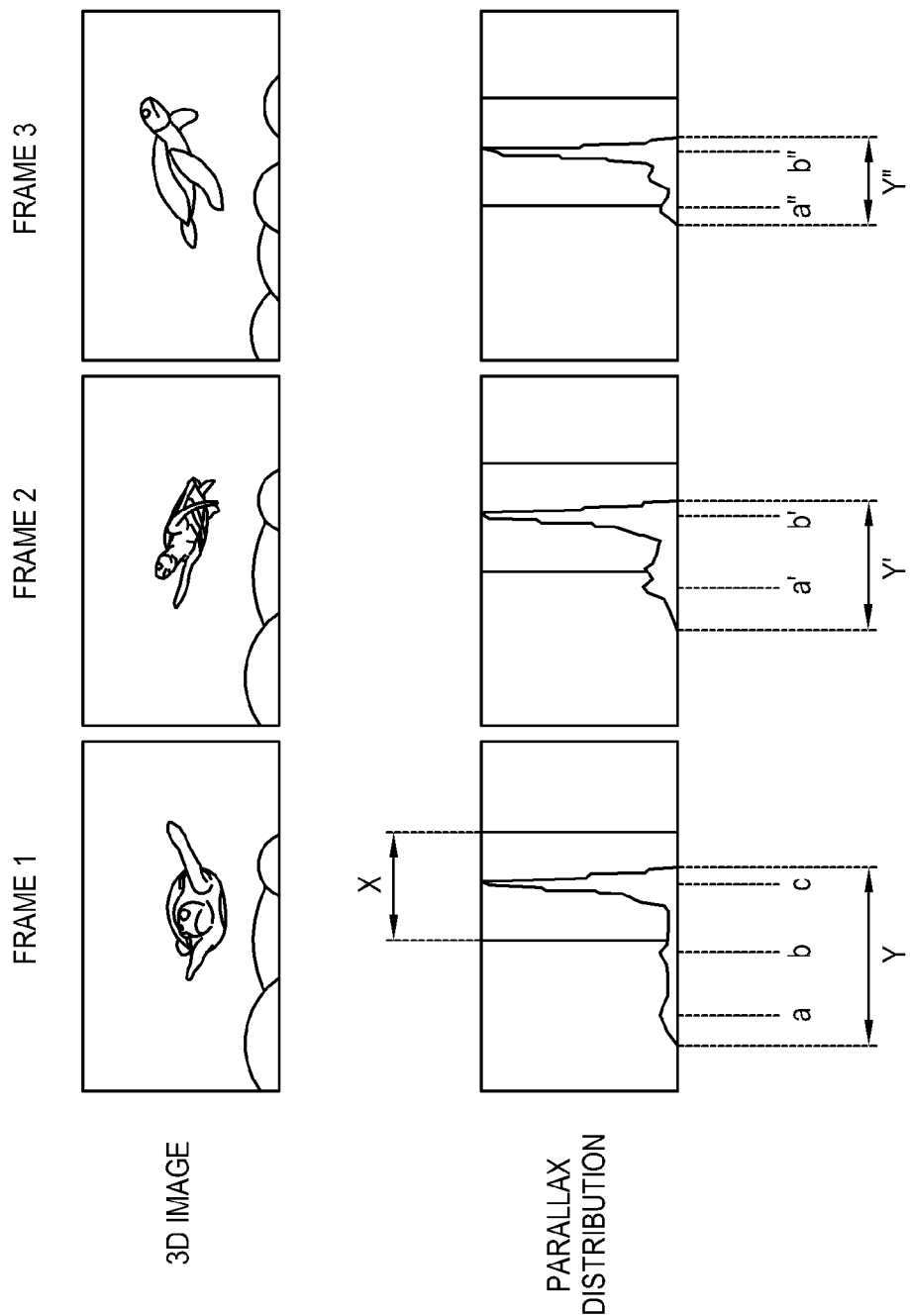

THREE-DIMENSIONAL IMAGE PROCESSING APPARATUS AND THREE-DIMENSIONAL IMAGE PROCESSING METHOD

CROSS-REFERENCE TO RELATED APPLICATION

This application claims priority from Korean Patent Application No. 10-2010-0113379, filed on Nov. 15, 2010 in the Korean Intellectual Property Office, the disclosure of which is incorporated herein in its entirety by reference.

BACKGROUND

1. Field

Apparatuses and methods consistent with exemplary embodiments relate to a three-dimensional (3D) image processing apparatus and a 3D image processing method, and more particularly, to a 3D image processing apparatus which adjusts parallax of a 3D image to reduce viewer fatigue, and a 3D image processing method.

2. Description of the Related Art

FIGS. 1A and 1B illustrate a process of adjusting parallax of a three-dimensional (3D) image according to a related art. When a 3D image is transmitted from an outside, an image processing apparatus according to the related art estimates binocular parallax of the 3D image. FIG. 1A illustrates a parallax distribution of estimated binocular parallax with respect to successive frames 1 to 3. When focus control parameters a to c are determined from estimated parallax distribution of the frame 1, a left eye image and a right eye image are horizontally moved so that focus control parameters a and b positioned out of an X range, which is a view fatigue safety range, is located within the X range. Likewise, in the frame 2, a left eye image and a right eye image are horizontally moved so that a focus control parameter a' is within the X range. In the frame 3, a left eye image and a right eye image are horizontally moved so that a focus control parameter a" is within the X range. In this instance, horizontal movement is performed with respect to each of the control parameters a, b, and c in the frame 1 to change a focus, resulting in a successive change of the focus in the frames 1 to 3. Accordingly, the focus is drastically changed separately or successively in the respective frames, and thus a viewer feels severe fatigue.

Further, as shown in FIG. 1B, when there is an object A of an input image seen in a left eye image but not seen in a right eye image, an error may occur in estimating binocular parallax between the left eye image and the right eye image. Moreover, an error may also occur in an estimated depth map generated based on the estimated parallax including the error. In addition, when a depth of the left eye image and the right eye image is adjusted based on the estimated depth map including the error, a viewer may feel greater fatigue.

SUMMARY

Accordingly, one or more exemplary embodiments provide an image processing apparatus which adjusts binocular parallax to minimize viewer's fatigue, and an image processing method.

Furthermore, one or more exemplary embodiments provide an image processing apparatus which corrects an estimated error in binocular parallax to minimize viewer's fatigue, and an image processing method.

According to an aspect of an exemplary embodiment, there is provided an image processing apparatus including: a parallax estimation unit which estimates parallax with respect to a left eye image and a right eye image corresponding to a current frame of a three-dimensional (3D) image; a horizontal movement value determination unit which determines a horizontal movement value with respect to the left eye image and the right eye image using the estimated parallax; a horizontal movement unit which horizontally moves the left eye image and the right eye image based on the determined horizontal movement value; and a controller which calculates a chronological change rate of the estimated parallax for a predetermined time, determines whether the chronological change rate is greater than a predetermined threshold, and if the chronological change rate is greater than the predetermined threshold, limits the horizontal movement value to a predetermined range and controls the horizontal movement unit to horizontally move the left eye image and the right eye image based on the limited horizontal movement value.

The controller may limit the horizontal movement value so that a difference between a horizontal movement value determined with respect to a previous frame and the horizontal movement value with respect to the current frame is in a preset range.

The controller may calculate a chronological change rate of color information about at least one of the left eye image and the right eye image for a predetermined time and may further determine whether the calculated chronological change rate of color information is greater than a predetermined threshold.

The predetermined time may correspond to a period of one scene including a plurality of frames.

The parallax estimation unit may estimate parallax of each frame, and the controller may control the horizontal movement unit to horizontally move the left eye image and the right eye image based on a horizontal movement value applied to a previous frame if the chronological change rate of the estimated time is greater than the predetermined threshold.

The image processing apparatus may further include a display unit which displays the left eye image and the right eye image which are adjusted in parallax and output from the horizontal movement unit.

According to an aspect of another exemplary embodiment, there is provided an image processing apparatus including: a parallax estimation unit which estimates parallax with respect to a left eye image and a right eye image corresponding to a frame of a 3D image; an error prediction unit which predicts an error in the parallax estimated by the parallax estimation unit; a horizontal movement value determination unit which determines a horizontal movement value with respect to the left eye image and the right eye image using the estimated parallax; a horizontal movement unit which horizontally moves the left eye image and the right eye image based on the horizontal movement value; and a controller which determines whether the predicted error value is greater than a predetermined threshold, and if the predicted error value is greater than the predetermined threshold, limits the horizontal movement value to a predetermined range and controls the horizontal movement unit to horizontally move the left eye image and the right eye image based on the limited horizontal movement value.

The controller may limit the horizontal movement value so that a difference between a horizontal movement value determined with respect to a previous frame and the horizontal movement value with respect to the current frame is in a preset range.

The parallax estimation unit may estimate parallax of each frame of a predetermined period corresponding to the current frame, and the controller may control the horizontal movement unit to horizontally move the left eye image and the right eye image based on a horizontal movement value applied to a previous frame if the predicted error value is greater than the predetermined threshold.

The image processing apparatus may further include a display unit which displays the left eye image and the right eye image which are adjusted in parallax and output from the horizontal movement unit.

According to an aspect of another exemplary embodiment, there is provided an image processing method of an image processing apparatus, the image processing method including: estimating parallax with respect to a left eye image and a right eye image corresponding to a frame of a 3D image; determining a horizontal movement value with respect to the left eye image and the right eye image using the estimated parallax; calculating a chronological change rate of the estimated parallax for a predetermined time and determining whether the chronological change rate is greater than a predetermined threshold; and if the chronological change rate is greater than the predetermined threshold, limiting the horizontal movement value to a predetermined range and horizontally moving the left eye image and the right eye image based on the limited horizontal movement value.

The limiting to the predetermined range may include limiting the horizontal movement value so that a difference between a horizontal movement value determined with respect to a previous frame and the horizontal movement value with respect to the current frame is in a preset range.

The image processing method may further include calculating a chronological change rate of color information about at least one of the left eye image and the right eye image for a predetermined time and determining whether the chronological change rate of color information is greater than a predetermined threshold.

The predetermined time may correspond to a period of one scene including a plurality of frames.

The estimating the parallax may estimate parallax of each frame of the predetermined time, and the horizontally moving may horizontally move the left eye image and the right eye image based on a horizontal movement value applied to a previous frame when the chronological change rate of the estimated time is greater than the predetermined threshold.

The image processing method may further include displaying the left eye image and the right eye image which are horizontally moved and adjusted in parallax.

According to an aspect of another exemplary embodiment, there is provided an image processing method of an image processing apparatus, the image processing method including: estimating parallax with respect to a left eye image and a right eye image corresponding to a frame of a 3D image; determining a horizontal movement value with respect to the left eye image and the right eye image using the estimated parallax; predicting an error in the estimated parallax; determining whether the predicted error value is greater than a predetermined threshold; and if the predicted error value is greater than the predetermined threshold, limiting the horizontal movement value to a predetermined range and horizontally moving the left eye image and the right eye image based on the limited horizontal movement value.

The limiting to the predetermined range may include limiting the horizontal movement value so that a difference between a horizontal movement value determined with respect to a previous frame and the horizontal movement value with respect to the current frame is in a preset range.

The estimating the parallax may estimate parallax of each frame of a predetermined period corresponding to the current frame, and the horizontally moving may horizontally move the left eye image and the right eye image based on a horizontal movement value applied to a previous frame when the predicted error value is greater than the predetermined threshold.

The image processing method may further include displaying the left eye image and the right eye image which are horizontally moved and adjusted in parallax.

According to an aspect of another exemplary embodiment, there is provided an image processing method of an image processing apparatus, the image processing method including: estimating parallax with respect to a left eye image and a right eye image corresponding to a current frame of a 3D image; determining a horizontal movement value with respect to the left eye image and the right eye image using the estimated parallax; and if a difference between the determined horizontal movement value and a horizontal movement value determined with respect to another frame in a predetermined period corresponding to the current frame is not in a preset range, limiting the horizontal movement value so that the difference is in the preset range.

As described above, exemplary embodiments provide an image processing apparatus which minimizes viewer's fatigue and an image processing method.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 1A and 1B illustrate parallax adjustment of an image processing apparatus according to a related art;

DETAILED DESCRIPTION OF EXEMPLARY EMBODIMENTS

Figure 1B:
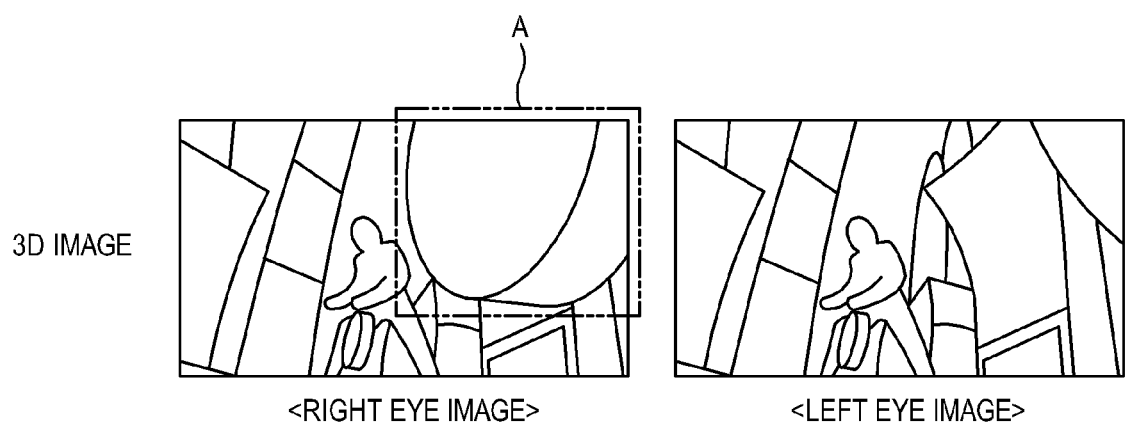

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

Figure 2:
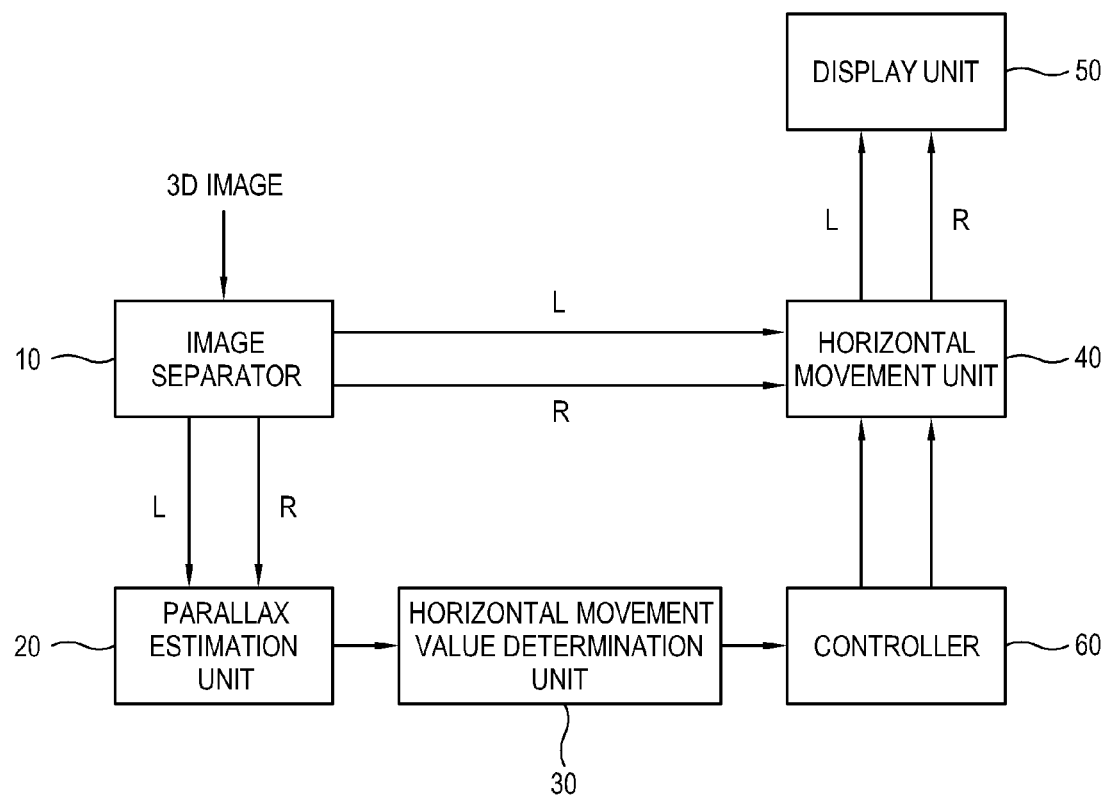
FIG. 2 is a block diagram of an image processing apparatus according to a first exemplary embodiment.
Figure 3:
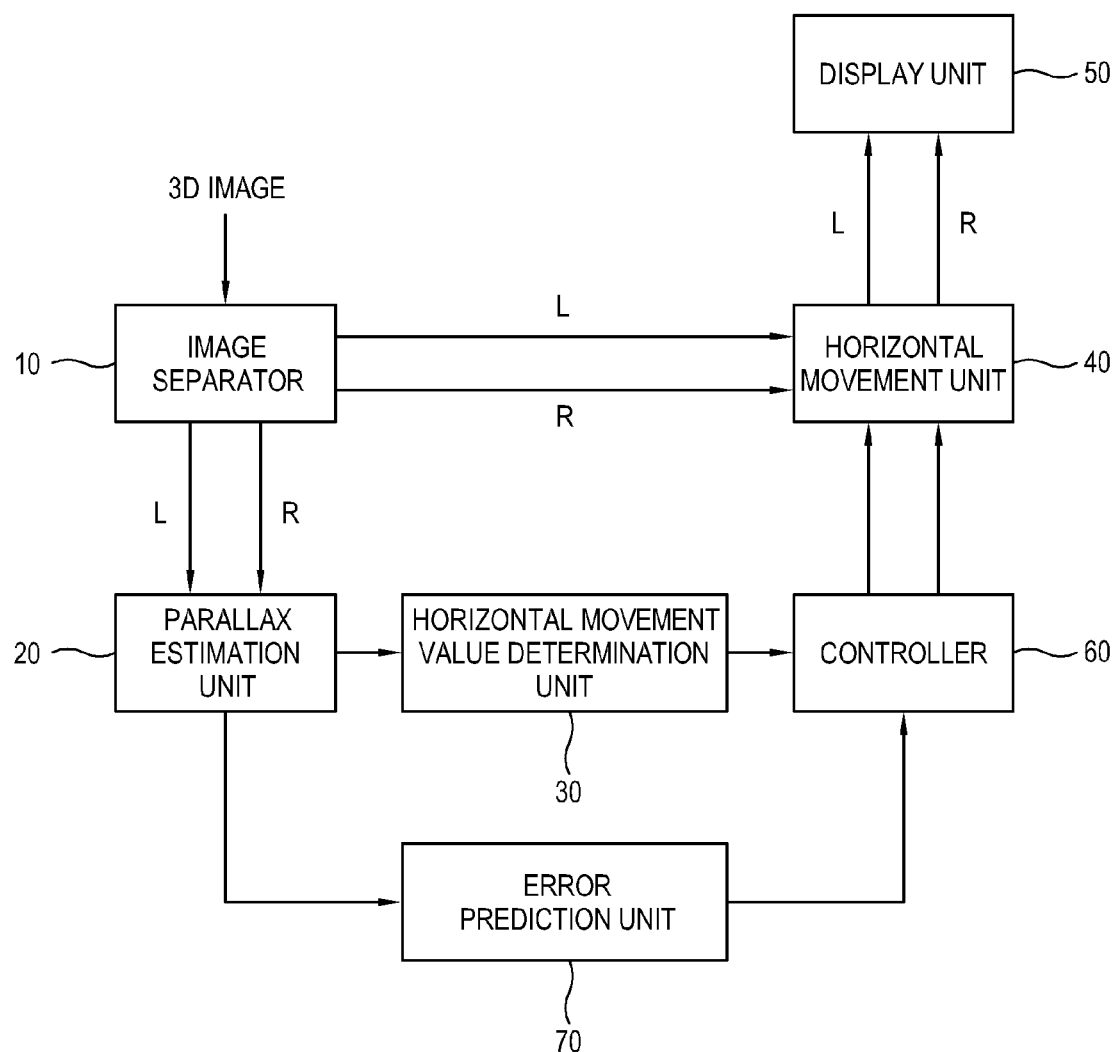
FIG. 3 is a block diagram of an image processing apparatus according to a second exemplary embodiment.

FIGS. 2 and 3 are block diagrams of image processing apparatuses according to exemplary embodiments.

In the following description, a three-dimensional (3D) image signal or a stereoscopic image signal refers to an image signal including a left eye image signal and a right eye image signal to provide 3D effects, and both terms are used with the same meaning.

Each of the image processing apparatuses in FIGS. 2 and 3 according to exemplary embodiments may include any type of electronic devices which receive and process a 3D image signal from an outside, for example, a set-top box, a personal video recorder (PVR), a mobile device, and a display device including a television (TV) and a personal computer (PC).

A user has different viewing angles from both eyes, and thus perceives a 3D effect of an object. Accordingly, a 3D image is divided into a left eye image and a right eye image to be alternately displayed on a display unit.

The image processing apparatus receives an image signal from an external image source (not shown). The image processing apparatus 100 may receive an image signal from various image sources such as, but not limited to, a computer (not shown) including a central processing unit (CPU) (not shown) and a graphic card (not shown) to generate and provide an image signal locally, a server (not shown) to provide an image signal via a network, and a transmitting device (not shown) of a broadcasting station to transmit a broadcasting signal using public or cable networks.

The image processing apparatus 100 may include a separate receiver (not shown) to receive an image signal from an external image source, or an image separator 10 may operate as the receiver. When the image processing apparatus is a TV, the receiver or the image separator 10 receives a radio frequency (RF) signal transmitted from a broadcasting transmission apparatus wirelessly or image signals in composite video, component video, super video, SCART, and high definition multimedia interface (HDMI) standards. Here, the receiver or the image separator 10 may further include at least one of an antenna (not shown) and a tuner (not shown) to tune a broadcast channel. When the image processing apparatus is a PC monitor, the receiver may be configured in a D-subminiature (D-SUB) standard to transmit red, green, and blue (RGB) signals based on a video graphics array (VGA) format, digital video interface (DVI) standards including DVI-analog (DVI-A), DVI-integrated digital/analog (DVI-I), and DVI-digital (DVI-D), a high-definition multimedia interface (HDMI) standard, or the like. Alternatively, the receiver or the image separator 10 may be configured as a DisplayPort, a unified display interface (UDI), or a wireless HD standard.

The image processing apparatus receives and processes a two-dimensional (2D) image signal or a 3D image signal from an outside so that the display unit 50 displays a 2D image or a 3D image. Here, unlike the 2D image, the 3D image (i.e., a frame of the 3D image) is divided into a left eye image corresponding to a left eye of a user and a right eye image corresponding to a right eye of the user. Thus, when the 3D image signal is received, the image processing apparatus controls the display unit to alternately display the left eye image and the right eye image based on the signal in a frame unit.

The image processing apparatus may further include a signal processor (not shown) to perform at least one of various types of preset image processing on an image signal. For example, the signal processor may perform, without limitation, at least one of decoding and encoding corresponding to various image formats, de-interlacing, frame refresh rate conversion, scaling, noise reduction to improve image quality, detail enhancement, and line scanning The signal processor may perform the above processes separately or in combination.

As shown in FIG. 2, the image processing apparatus according to the first exemplary embodiment includes the image separator 10, a parallax estimation unit 20, a horizontal movement value determination unit 30, a horizontal movement unit 40, a display unit 50, and a controller 60 to control the above components.

The image separator 10 receives and separates a 3D image signal into a left eye image and a right eye image and transmits the images to the parallax estimation unit 20 and the horizontal movement unit 40.

The parallax estimation unit 20 estimates a binocular parallax between the left eye image and the right eye image separated by the image separator 10 and transmits the estimated binocular parallax to the horizontal movement value determination unit 30. The estimation of the binocular parallax is performed may be performed by various methods, for example, by a parallax estimation method by blocks, and.

The parallax estimation method by blocks estimates a binocular parallax by dividing the left eye image and the right eye image into N×N uniform blocks, matching corresponding blocks to designate a block having the highest correlation as a search region, and defining a spatial positional difference between the block and a block to be processed as a binocular parallax value. The above process is a preprocessing to define a parallax value of a foreground and a background in the images. Here, the foreground denotes an important part in the images, for example, a central figure or object in a screen, and the background denotes a less important part in the images, for example, objects including a backdrop, mountains, and trees.

The horizontal movement value determination unit 30 receives the parallax estimated by the parallax estimation unit 20 to determine a horizontal movement value with respect to the left eye image and the right eye image. The horizontal movement value determination unit 30 calculates a difference between the received estimated parallax and parallax in a preset range and determines a horizontal movement value corresponding to the calculated difference. The preset range includes a viewer fatigue safety range, including a known view fatigue safety range.

The horizontal movement unit 40 moves the left eye image and the right eye image horizontally based on the horizontal movement value determined by the horizontal movement value determination unit 30 to adjust the parallax between the left eye image and the right eye image.

The display unit 50 alternately displays the left eye image and the right eye image which are adjusted in parallax by the horizontal movement unit 40, so that the user perceives 3D effects.

The display unit 50 includes a display panel (not shown) to display the images, wherein the display panel may include a liquid crystal display (LCD) including a liquid crystal layer, an organic light emitting diode (OLED) including a light emitting layer of organic materials, a plasma display panel (PDP), or the like. However, it is understood that another exemplary embodiment is not limited to the image processing apparatus including a display unit 50. For example, according to another exemplary embodiment, the image processing apparatus may not include the display unit 50, and may instead output the left eye image and the right eye image which are adjusted in parallax to be displayed by an external display unit.

The controller 60 calculates a chronological change rate of the parallax estimated by the parallax estimation unit 20 for a predetermined time and determines whether the calculated chronological change rate is greater than a predetermined threshold. If the calculated chronological change rate is greater than the predetermined threshold, the controller 60 controls the horizontal movement unit 40 to limit the horizontal movement value determined by the horizontal movement value determination unit 30 to a predetermined range and to move the left eye image and the right eye image horizontally based on the limited horizontal movement value.

The image separator 10, the parallax estimation unit 20, and the horizontal movement value determination unit 30 perform operations thereof in each frame of a received 3D image. The controller 60 calculates a chronological change rate of parallax estimated for a predetermined time or for a predetermined number of frames. For example, the controller 60 calculates a chronological change rate of the estimated parallax based on one scene including at least one frame. The controller 60 determines whether the calculated chronological change rate is greater than a predetermined threshold. If the chronological change rate is greater than the predetermine threshold, the controller 60 limits a horizontal movement value determined with respect to the current frame to a predetermined range. For example, the predetermined range allows a difference between a horizontal movement value determined with respect to a previous frame and the horizontal movement value determined with respect to the current frame to be in a preset range. Furthermore, if the chronological change rate is greater than the predetermine threshold, the controller 60 may control the horizontal movement unit 40 to horizontally move the left eye image and the right eye image by applying the horizontal movement value determined with respect to the previous frame, and not applying the horizontal movement value determined with respect to the current frame.

Moreover, the controller 60 may further calculate a chronological change rate of color information about at least one of the left eye image and the right eye image for a predetermined time (or a predetermined number of frames) and determine whether the calculated chronological change rate is greater than a predetermined threshold.

The controller 60 may calculate a chronological change rate of the color information for the predetermined time or for a predetermined number of frames. For example, the controller 60 may calculate a chronological change rate of the color information based on one scene including at least one frame.

The color information may include at least one of a contrast and a brightness of the left eye image and the right eye image.

The controller 60 may determine whether the predetermined threshold is exceeded based on each or both of the calculated chronological change rate and the chronological change rate of the color information.

As shown in FIG. 3, the image processing apparatus according to the second exemplary embodiment includes an image separator 10, a parallax estimation unit 20, a horizontal movement value determination unit 30, a horizontal movement unit 40, a display unit 50, an error prediction unit 70, and a controller 60 to control the above components. Unlike the image processing apparatus in FIG. 2, the image processing apparatus of the present exemplary embodiment further includes the error prediction unit 70. The image separator 10, the parallax estimation unit 20, the horizontal movement value determination unit 30, the horizontal movement unit 40, and the display unit 50 are similar to those described above with reference to FIG. 2, and thus descriptions thereof are omitted herein.

The error prediction unit 70 receives an estimated parallax of a left eye image and a right eye image from the parallax estimation unit 20 and predicts an error in parallax.

The error prediction unit 70 calculates at least one of a weighted averaged statistical value of a spatial uniformity and a sum of absolute difference (SAD) of an estimated parallax map between the left eye image and the right eye image. The greater the calculated averaged statistical value is, the higher possibility an error occurs in estimating parallax.

The controller 60 receives a predicted error value from the error prediction unit 70 and determines whether the predicted error value is greater than a predetermined threshold. If the predicted error value is greater than the predetermined threshold, the controller 60 limits a horizontal movement value determined by the horizontal movement value determination unit 30 to a predetermined range and controls the horizontal movement unit 40 to horizontally move the left eye image and the right eye image based on the limited horizontal movement value.

If the predicted error value is greater than the predetermined threshold, the controller 60 limits a horizontal movement value determined with respect to a current frame to a predetermined range. For example, the predetermined range allows a difference between a horizontal movement value determined with respect to a previous frame and the horizontal movement value determined with respect to the current frame to be in a preset range. If the predicted error value is greater than the predetermined threshold, the controller 60 may control the horizontal movement unit 40 to horizontally move the left eye image and the right eye image by applying the horizontal movement value determined with respect to the previous frame, and not applying the horizontal movement value determined with respect to the current frame.

Figure 4:
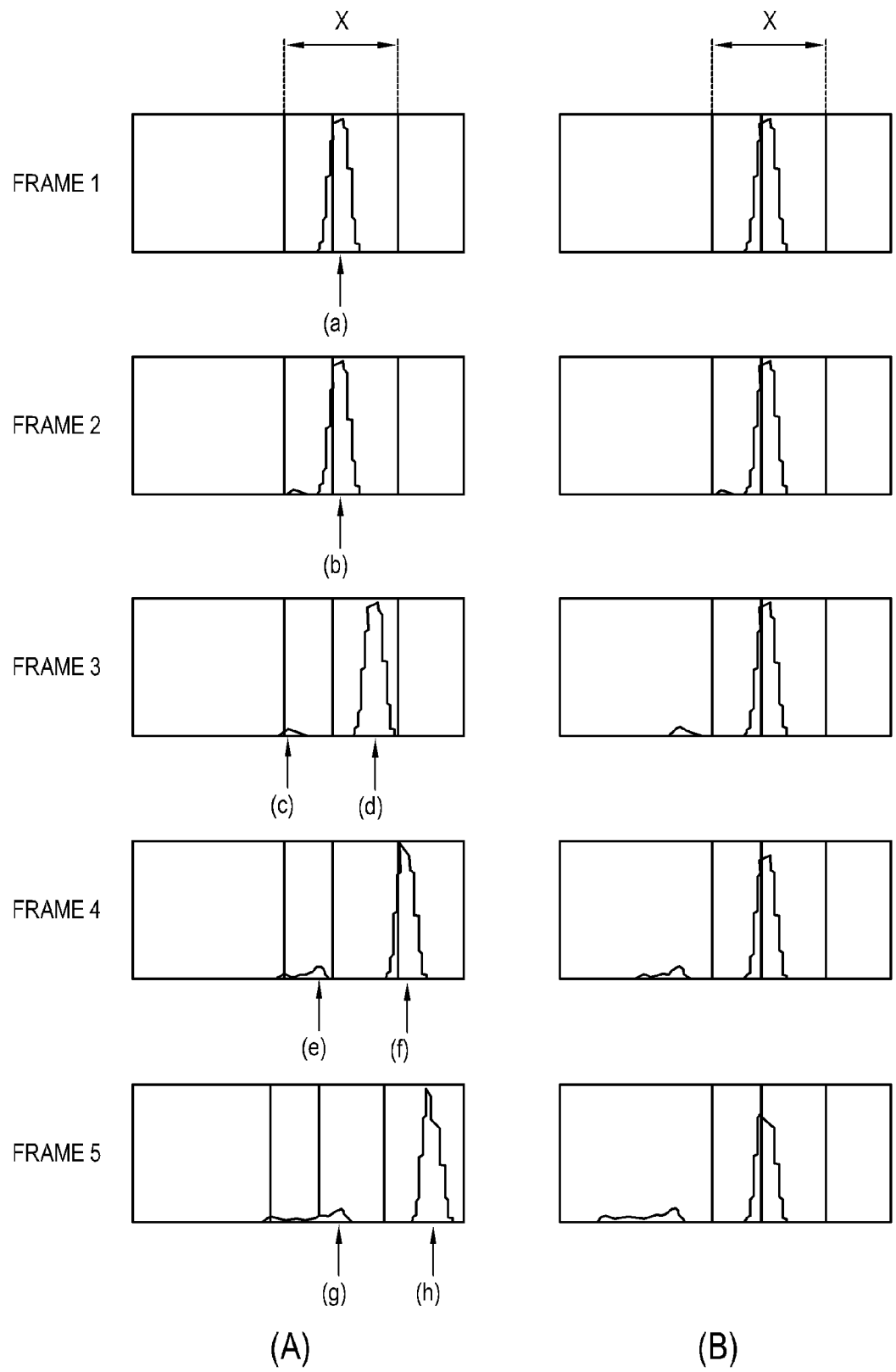
FIG. 4 illustrates an example of parallax adjustment of the image processing apparatuses according to the first and second exemplary embodiments.

FIG. 4 illustrates an example of adjusting parallax by the image processing apparatus according to the first exemplary embodiment.

Assuming that a frame 1 to a frame 5 correspond to one scene, the image separator 10 separates each of the frame 1 to the frame 5 into a left eye image and a right eye image and transmits the images to the parallax estimation unit 20. The parallax estimation unit 20 estimates parallax of each frame, which is shown in (A) of FIG. 4. The horizontal movement value determination unit 30 determines a focus control parameter from estimated parallax distribution, which is (a) in the frame 1, (b) in the frame 2, (c) and (d) in the frame 3, (e) and (f) in the frame 4, and (g) and (h) in the frame 5. As shown in FIG. 4, the frame 1 and the frame 2 have almost similar focus control parameters within a view fatigue safety range X. The horizontal movement value determination unit 30 determines a difference in parallax between a focus control parameter and the X range with respect to each frame to determine a horizontal movement value.

The controller 60 determines whether parallax determined by the parallax estimation unit 20 during the frame 1 to the frame 5 is greater than a predetermined threshold. If the parallax is greater than the predetermined threshold, the controller 60 limits a horizontal movement value determined by the horizontal movement value determination unit 30 to a predetermined range and controls the horizontal movement unit 40 to horizontally move the left eye image and the right eye image based on the limited horizontal movement value.

Thus, the controller 60 limits a horizontal movement value of the frame 3, in which estimated parallax is changed drastically, to a predetermined range. That is, the controller 60 limits the horizontal movement value of the frame 3 so that a difference between a horizontal movement value of the frame 2 and the horizontal movement value of the frame 3 is within a preset range and controls the horizontal movement unit 40 to apply the limited horizontal movement value. For example, the controller 60 adjusts the horizontal movement of the frame 3 having the drastically changed estimated parallax to be the same as the horizontal movement value of the previous frame 2 and controls the horizontal movement unit 40 to horizontally move the left eye image and the right eye image of the frame 3 based on the adjusted horizontal movement value of the frame.

The same process is applied to the frame 4 and the frame 5. For example, as the horizontal movement value of the frame 2 is applied to the frame 3, the horizontal movement value of the frame 3, that is the horizontal movement value of the frame 2, is applied to the frame 4, and a horizontal movement value of the frame 4, that is the horizontal movement value of the frame 2, is applied to the frame 5.

The results are shown in (B) of FIG. 4. The left eye image and the right eye image are horizontally moved so that the frame 1 to the frame 5 included in the one scene have almost the same focus positions within the X range. Accordingly, viewer's fatigue may remarkably decrease as a drastic change of a focus within at least one scene is prevented.

Adjusting parallax by the image processing apparatus according to the second exemplary embodiment may be performed in a similar manner.

Specifically, the image separator 10 separates a plurality of frames into a left eye image and a right eye image and transmits the images to the parallax estimation unit 20. The parallax estimation unit 20 estimates parallax of each frame and transmits the estimated parallax to the horizontal movement value determination unit 40 and the error prediction unit 70. The horizontal movement value determination unit 40 determines a horizontal movement value based on the estimated parallax. The error prediction unit 70 calculates at least one of a weighted averaged statistical value of a spatial uniformity and an SAD from the estimated parallax to predict an error. The controller 60 determines whether a predicted error value is greater than a predetermined threshold. If the predicted error value is greater than the predetermined threshold, the controller 60 limits a horizontal movement value determined with respect to a current frame to a predetermined range and controls the horizontal movement unit 40 to apply the limited horizontal movement value. For example, the controller 60 may replace the horizontal movement value with respect to the current frame with a horizontal movement value determined with respect to a previous frame and control the horizontal movement unit 40 to apply the horizontal movement value with respect to the previous frame. Accordingly, horizontal movement is adjusted with respect to an error predicted frame to remarkably reduce viewer's fatigue.

Figure 5:
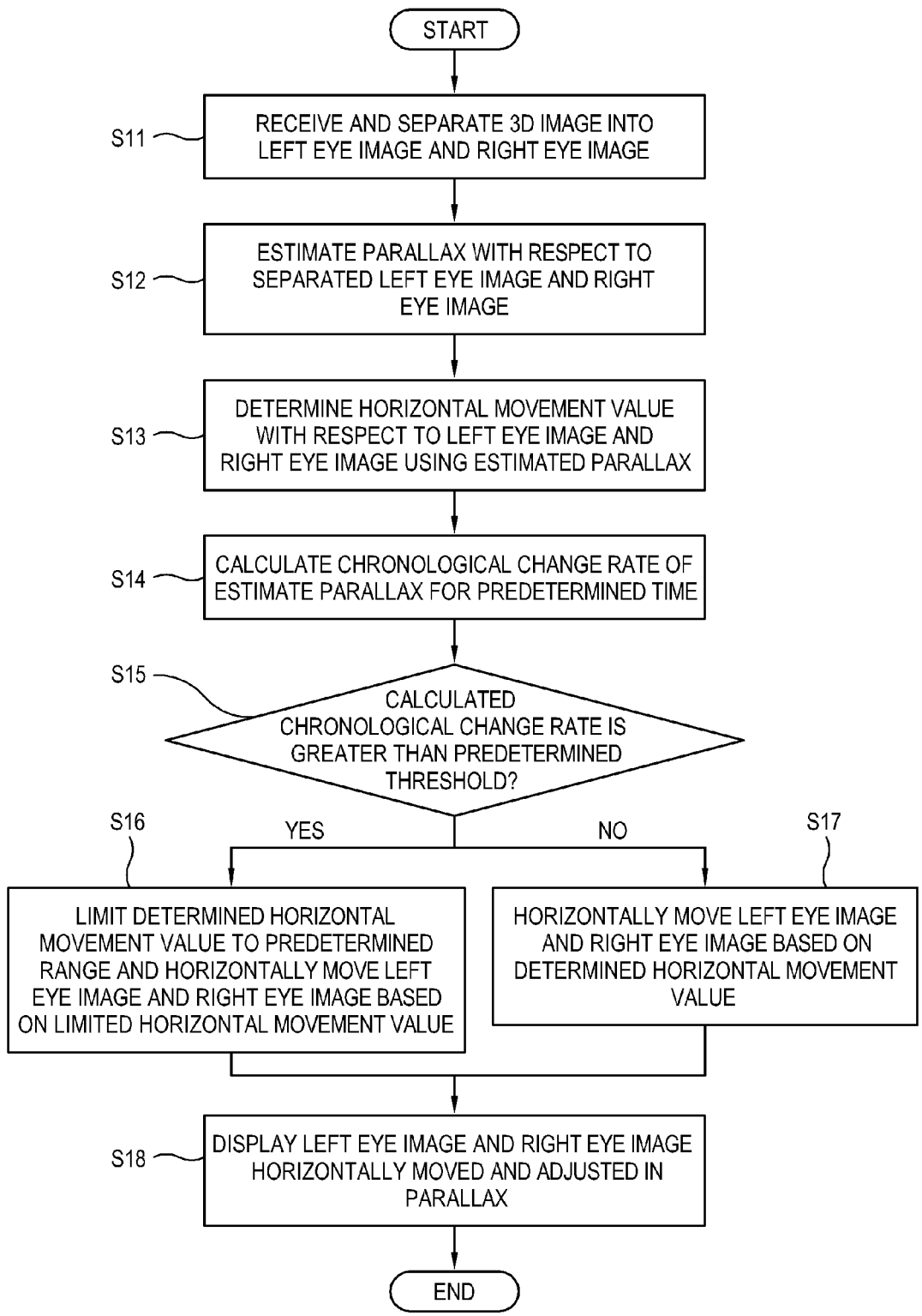
FIG. 5 is a flowchart illustrating an image processing method of the image processing apparatus according to the first exemplary embodiment.

FIG. 5 is a flowchart illustrating an image processing method of the image processing apparatus according to the first exemplary embodiment.

The image processing method of the image processing apparatus receives and separates a 3D image into a left eye image and a right eye image (operation S11), and estimates parallax with respect to the left eye image and the right eye image (operation S12). A horizontal movement value with respect to the left eye image and the right eye image is determined using the estimated parallax (operation S13). A chronological change rate of the estimated parallax for a predetermined time or for a predetermined number of frames is calculated (operation S14), and it is determined whether the chronological change rate is greater than a predetermined threshold (operation S15). If the chronological change rate is greater than the predetermined threshold, the horizontal movement value determined in the determination operation of the horizontal movement value is limited to a predetermined range, and the horizontal movement unit is controlled to horizontally move the left eye image and the right eye image based on the limited horizontal movement value (operation S16). In the horizontal movement operation, the limitation to the predetermined range may limit a horizontal movement value with respect to a current frame so that a difference between a horizontal movement value determined with respect to a previous frame and the horizontal movement value determined with respect to the current frame is in a preset range. For example, in the horizontal movement operation, the horizontal movement value with respect to the current frame may be replaced by the horizontal movement value determined with respect to the previous frame, and the horizontal movement unit may be controlled to apply the horizontal movement value with respect to the previous frame to the current frame.

Further, the method may further include a process of calculating a chronological change rage of color information about at least one of the left eye image and the right eye image for a predetermined time or for a predetermined number of frames and determining whether the calculated chronological change rate is greater than a predetermined threshold. The predetermined time may correspond to a period of one scene including a plurality of frames.

If the chronological change rate is not greater than the predetermined threshold (operation S15), the horizontal movement unit is controlled to horizontally move the left eye image and the right eye image based on the horizontal movement value determined by the horizontal movement value determination unit (operation S17).

The left eye image and the right eye image which are horizontally moved and adjusted in parallax are alternately displayed on a display unit (operation S18).

Figure 6:
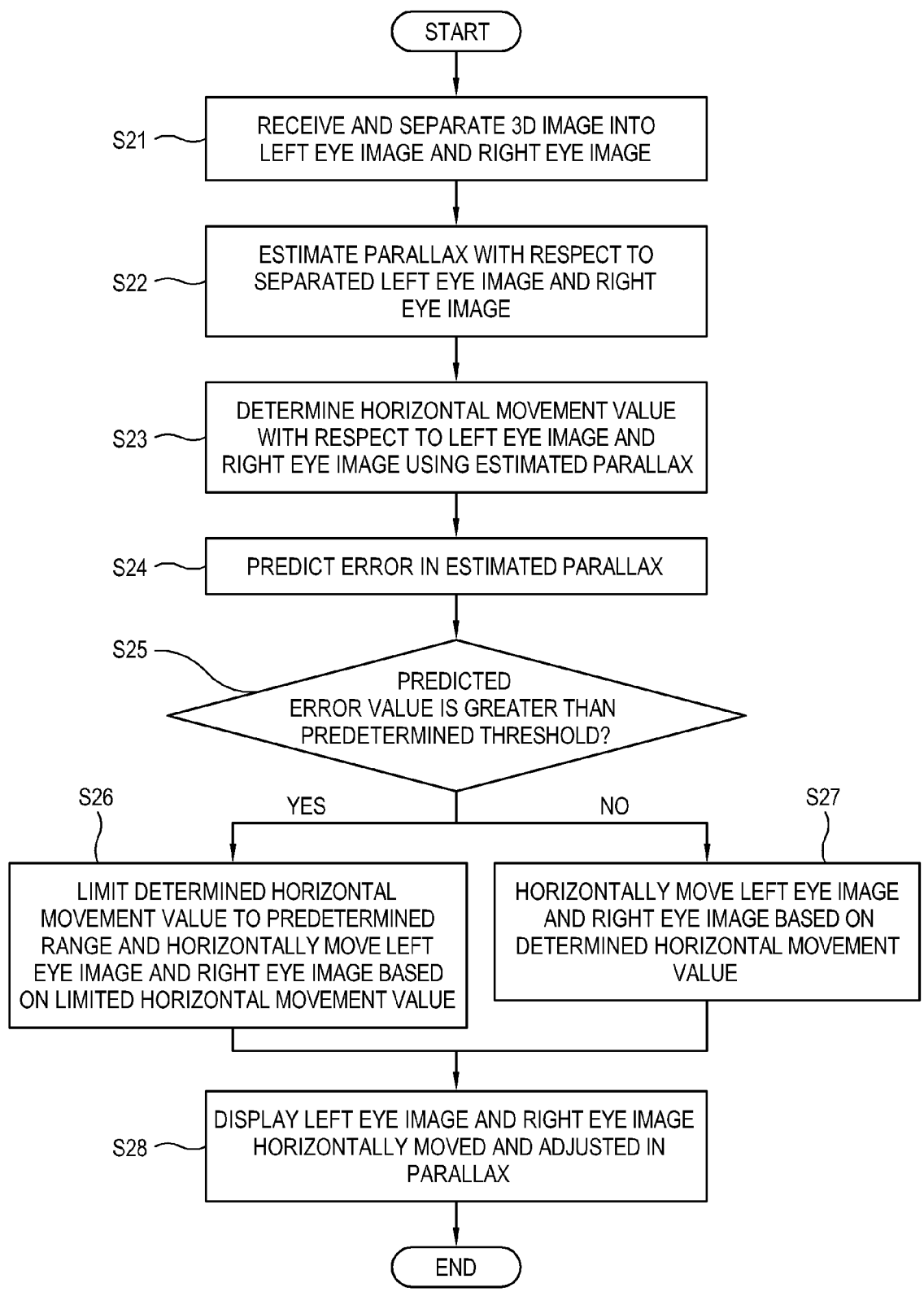
FIG. 6 is a flowchart illustrating an image processing method of control of the image processing apparatus according to the second exemplary embodiment.

FIG. 6 is a flowchart illustrating an image processing method of the image processing apparatus according to the second exemplary embodiment.

The image processing method of the image processing apparatus receives and separates a 3D image into a left eye image and a right eye image (operation S21), and estimates parallax with respect to the left eye image and the right eye image (operation S22). A horizontal movement value with respect to the left eye image and the right eye image is determined using the estimated parallax (operation S23). An error in the parallax estimated in the parallax estimation operation is predicted (operation S24), and it is determined whether the predicted error value in the error prediction operation is greater than a predetermined threshold (operation S25). If the predicted error value is greater than the predetermined threshold, the horizontal movement value determined in the determination operation of the horizontal movement value is limited to a predetermined range, and the left eye image and the right eye image are horizontally moved based on the limited horizontal movement value (operation S26).

In the horizontal movement operation, the limitation to the predetermined range may limit a horizontal movement value with respect to a current frame so that a difference between a horizontal movement value determined with respect to a previous frame and the horizontal movement value determined with respect to the current frame is in a preset range. For example, in the horizontal movement operation, the horizontal movement value with respect to the current frame may be replaced by the horizontal movement value determined with respect to the previous frame, and the horizontal movement unit may be controlled to apply the horizontal movement value with respect to the previous frame to the current frame.

If the predicted error value is not greater than the predetermined threshold, the left eye image and the right eye image are horizontally moved based on the horizontal movement value determined in the horizontal movement value determination process (operation S27).

The left eye image and the right eye image which are horizontally moved and adjusted in parallax are alternately displayed on a display unit (operation S28).

The 3D image processing apparatus and the 3D image processing method according to the above-described exemplary embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as read-only memory (ROM), random access memory (RAM), CO-ROM, magnetic tapes, floppy disks, optical data storage devices, and the like. Further, the non-transitory computer-readable media may also be configured in a carrier-wave form, such as a transmission through the Internet. The non-transitory computer-readable media may be connected to a computer system connected via a network to store and execute computer-readable codes in a distributed scheme. Moreover, one or more units of the image processing apparatus can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An image processing apparatus comprising:
    a parallax estimation unit configured to estimate parallax with respect to a left eye image and a right eye image corresponding to a current frame of a three-dimensional (3D) image;
    a horizontal movement value determination unit configured to determine a horizontal movement value with respect to the left eye image and the right eye image by determining a focus control parameter using the estimated parallax and by determining a difference in parallax between the focus control parameter and a view fatigue safety range with respect to the current frame;
    a horizontal movement unit configured to horizontally move the left eye image and the right eye image based on the determined horizontal movement value; and
    a controller configured to calculate a chronological change rate of the estimated parallax for a predetermined time, determine whether the calculated chronological change rate is greater than a predetermined threshold, and, limit the horizontal movement value to a predetermined range and control the horizontal movement unit to horizontally move the left eye image and the right eye image based on the limited horizontal movement value in response to the calculated chronological change rate being greater than the predetermined threshold.

2. The image processing apparatus of claim 1, further comprising:
    an image separator configured to receive the 3D image and separate the current frame of the received 3D image into the left eye image and the right eye image.

3. The image processing apparatus of claim 1, wherein the controller limits the horizontal movement value to the predetermined range so that a difference between a horizontal movement value determined with respect to another frame of the predetermined time and the determined horizontal movement value with respect to the current frame is in a preset range.

4. The image processing apparatus of claim 3, wherein the other frame is a directly previous frame to the current frame.

5. The image processing apparatus of claim 1, wherein the controller calculates a chronological change rate of color information about at least one of the left eye image and the right eye image for a predetermined time and determines whether the chronological change rate of color information is greater than a predetermined threshold.

6. The image processing apparatus of claim 1, wherein the predetermined time corresponds to a period of one scene comprising a plurality of frames.

7. The image processing apparatus of claim 1, wherein the parallax estimation unit estimates parallax of each frame of the predetermined time, and the controller controls the horizontal movement unit to horizontally move the left eye image and the right eye image based on a horizontal movement value applied to a previous frame if the calculated chronological change rate of the estimated parallax is greater than the predetermined threshold.

8. The image processing apparatus of claim 1, further comprising:
    a display unit configured to display the left eye image and the right eye image which are adjusted in parallax and output from the horizontal movement unit.

9. The image processing apparatus of claim 1, wherein the predetermined time is a predetermined period of time or a predetermined number of frames.

10. An image processing apparatus comprising:
    a parallax estimation unit configured to estimate parallax with respect to a left eye image and a right eye image corresponding to a current frame of a 3D image;
    an error prediction unit configured to predict an error in the parallax with respect to the left eye image and the right eye image estimated by the parallax estimation unit;
    a horizontal movement value determination unit configured to determine a horizontal movement value with respect to the left eye image and the right eye image by determining a focus control parameter using the estimated parallax and by determining a difference in parallax between the focus control parameter and a view fatigue safety range with respect to the current frame;
    a horizontal movement unit configured to horizontally move the left eye image and the right eye image based on the determined horizontal movement value; and
    a controller configured to determine whether a value of the predicted error is greater than a predetermined threshold, and limit the horizontal movement value to a predetermined range and controls the horizontal movement unit to horizontally move the left eye image and the right eye image based on the limited horizontal movement value in response to the predicted error value being greater than the predetermined threshold.

11. The image processing apparatus of claim 10, wherein the controller limits the horizontal movement value to the predetermined range so that a difference between a horizontal movement value determined with respect to another frame and the determined horizontal movement value with respect to the current frame is in a preset range.

12. The image processing apparatus of claim 10, wherein the parallax estimation unit estimates parallax of each frame of a predetermined period corresponding to the current frame, and the controller controls the horizontal movement unit to horizontally move the left eye image and the right eye image based on a horizontal movement value applied to a previous frame if the predicted error value is greater than the predetermined threshold.

13. The image processing apparatus of claim 10, further comprising:
a display unit configured to display the left eye image and the right eye image which are adjusted in parallax and output from the horizontal movement unit.

14. An image processing method of an image processing apparatus, the image processing method comprising:
estimating parallax with respect to a left eye image and a right eye image corresponding to a current frame of a 3D image;
determining a horizontal movement value with respect to the left eye image and the right eye image using the estimated parallax and by determining a difference in parallax between a focus control parameter and a view fatigue safety range with respect to the current frame;
calculating a chronological change rate of the estimated parallax for a predetermined time and determining whether the chronological change rate is greater than a predetermined threshold; and
limiting the horizontal movement value to a predetermined range and horizontally moving the left eye image and the right eye image based on the limited horizontal movement value in response to the chronological change rate being greater than the predetermined threshold.

15. The image processing method of claim 14, wherein the limiting to the predetermined range comprises limiting the horizontal movement value so that a difference between a horizontal movement value determined with respect to a previous frame and the determined horizontal movement value with respect to the current frame is in a preset range.

16. The image processing method of claim 14, further comprising:
calculating a chronological change rate of color information about at least one of the left eye image and the right eye image for a predetermined time and determining whether the chronological change rate of color information is greater than a predetermined threshold.

17. The image processing method of claim 14, wherein the predetermined time corresponds to a period of one scene comprising a plurality of frames.

18. The image processing method of claim 14,
wherein the estimating the parallax comprises estimating parallax of each frame of the predetermined time, and
wherein the horizontally moving comprises horizontally moving the left eye image and the right eye image based on a horizontal movement value applied to a previous frame when the calculated chronological change rate of the estimated parallax is greater than the predetermined threshold.

19. The image processing method of claim 14, further comprising:
displaying the left eye image and the right eye image which are horizontally moved and adjusted in parallax.

20. An image processing method of an image processing apparatus, the image processing method comprising:
estimating parallax with respect to a left eye image and a right eye image corresponding to a current frame of a 3D image;
determining a horizontal movement value with respect to the left eye image and the right eye image using the estimated parallax and by determining a difference in parallax between a focus control parameter and a view fatigue safety range with respect to the current frame;
predicting an error in the estimated parallax with respect to the left eye image and the right eye image;
determining whether a value of the predicted error is greater than a predetermined threshold; and
limiting the horizontal movement value to a predetermined range and horizontally moving the left eye image and the right eye image based on the limited horizontal movement value in response to the predicted error value being greater than the predetermined threshold.

21. The image processing method of claim 20, wherein the limiting to the predetermined range comprises limiting the horizontal movement value so that a difference between a horizontal movement value determined with respect to a previous frame and the horizontal movement value with respect to the current frame is in a preset range.

22. The image processing method of claim 20,
wherein the estimating the parallax comprises estimating the parallax of each frame of a predetermined period corresponding to the current frame, and
wherein the horizontally moving comprises horizontally moving the left eye image and the right eye image based on a horizontal movement value applied to a previous frame when the predicted error value is greater than the predetermined threshold.

23. The image processing method of claim 20, further comprising:
displaying the left eye image and the right eye image which are horizontally moved and adjusted in parallax.

24. An image processing method of an image processing apparatus, the image processing method comprising:
estimating parallax with respect to a left eye image and a right eye image corresponding to a current frame of a 3D image;
determining a horizontal movement value with respect to the left eye image and the right eye image using the estimated parallax and by determining a difference in parallax between a focus control parameter and a view fatigue safety range with respect to the current frame; and
limiting the horizontal movement value so that the difference is in the preset range in response to a difference between the determined horizontal movement value and a horizontal movement value determined with respect to another frame in a predetermined period corresponding to the current frame not being in a preset range.

25. A non-transitory computer readable recording medium having recorded thereon a program executable by a computer for performing the method of claim 14.

26. A non-transitory computer readable recording medium having recorded thereon a program executable by a computer for performing the method of claim 20.

27. A non-transitory computer readable recording medium having recorded thereon a program executable by a computer for performing the method of claim 24.

* * * * *